United States Patent
Low (10) Patent No.: US 12,086,865 B2
(45) Date of Patent: Sep. 10, 2024

(54) SYSTEM AND METHOD FOR DYNAMICALLY ORCHESTRATING APPLICATION PROGRAM INTERFACE TRUST

(71) Applicant: DELL PRODUCTS L.P., Round Rock, TX (US)

(72) Inventor: Chooi Peng Low, Plano, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 17/976,036

(22) Filed: Oct. 28, 2022

(65) Prior Publication Data
US 2023/0047485 A1 Feb. 16, 2023

Related U.S. Application Data

(62) Division of application No. 16/780,804, filed on Feb. 3, 2020, now Pat. No. 11,526,928.

(51) Int. Cl.
*H04L 29/06* (2006.01)
*G06Q 20/02* (2012.01)
(Continued)

(52) U.S. Cl.
CPC ......... *G06Q 30/0635* (2013.01); *G06Q 20/02* (2013.01); *G06Q 20/12* (2013.01);
(Continued)

(58) Field of Classification Search
CPC ... H04L 9/30; H04L 63/0428; H04L 63/0823; H04L 63/12; H04L 67/02
See application file for complete search history.

(56) References Cited

U.S. PATENT DOCUMENTS 9,009,808 B2 4/2015 Ross et al.
2002/0099663 A1 7/2002 Yoshino et al.
(Continued)

FOREIGN PATENT DOCUMENTS

WO WO-2020105892 A1 * 5/2020 ........... H04L 9/0825

OTHER PUBLICATIONS

Lins et al., "Trust is Good, Control is Better: Creating Secure Clouds by Continuous Auditing", IEEE Transactions on Cloud Computing, vol. 6, No. 3, Jul.-Sep. 2018.*
(Continued)

*Primary Examiner* — Morshed Mehedi
(74) *Attorney, Agent, or Firm* — Larson Newman, LLP (57) ABSTRACT

A system includes a purchase portal configured to receive a purchase order from a customer, wherein the purchase order includes a service from each of a plurality of service providers. When receipt of the purchase order is detected, a processor determines first and second ones of the service providers associated with the purchase order; and establishes a trust relationship between the first service provider and the second service provider in a context of the customer. The processor also sends a first request for a first trust artifact to the first service provider and a second request for a second trust artifact to the second service provider; receives the first trust artifact from the first service provider, receives the second trust artifact from the second service provider, sends the first trust artifact to the second service provider, and sends the second trust artifact to the first service provider.

20 Claims, 5 Drawing Sheets

(51) Int. Cl.
*G06Q 20/12* (2012.01)
*G06Q 30/0208* (2023.01)
*G06Q 30/0601* (2023.01)
*H04L 9/30* (2006.01)
*H04L 9/40* (2022.01)

(52) U.S. Cl.
CPC ........... *G06Q 30/0208* (2013.01); *H04L 9/30* (2013.01); *H04L 63/0428* (2013.01); *H04L 63/0823* (2013.01)

(56) References Cited

U.S. PATENT DOCUMENTS

| | | |
|---|---|---|
| 2006/0106836 A1 | 5/2006 | Masugi et al. |
| 2010/0281522 A1 | 11/2010 | Hataketama |
| 2012/0209735 A1* | 8/2012 | Subramanian .......... H04L 9/321 705/26.1 |
| 2012/0331286 A1 | 12/2012 | Choi et al. |
| 2013/0305054 A1 | 11/2013 | Burchett et al. |
| 2014/0122873 A1* | 5/2014 | Deutsch .............. H04L 63/0884 713/158 |
| 2014/0173754 A1 | 6/2014 | Barbir |
| 2015/0350198 A1* | 12/2015 | Li ........................ G06F 21/645 713/156 |
| 2016/0056962 A1 | 2/2016 | Mehtälä |
| 2016/0254918 A1* | 9/2016 | Liu ..................... H04L 63/0823 713/156 |
| 2017/0078922 A1 | 3/2017 | Raleigh et al. |
| 2017/0118200 A1* | 4/2017 | Leggette ............... H04L 63/101 |
| 2017/0126642 A1 | 5/2017 | Basin |
| 2017/0213206 A1 | 7/2017 | Shearer |
| 2017/0244695 A1 | 8/2017 | Lund et al. |
| 2017/0249132 A1 | 8/2017 | Andrews et al. |
| 2018/0139308 A1 | 5/2018 | Andrews et al. |
| 2018/0288008 A1 | 10/2018 | Ganesan |
| 2018/0288045 A1 | 10/2018 | Karunakaran et al. |
| 2019/0080308 A1 | 3/2019 | Sheikh et al. |
| 2019/0245843 A1 | 8/2019 | Ja et al. |
| 2019/0327315 A1 | 10/2019 | Grooters et al. |
| 2020/0213114 A1 | 7/2020 | Sarin |
| 2020/0296113 A1 | 9/2020 | Agarwal et al. |
| 2020/0314089 A1 | 10/2020 | Iasynetskyi et al. |
| 2021/0037007 A1* | 2/2021 | Gupta ..................... G06F 9/546 |
| 2021/0320922 A1 | 10/2021 | Furhmann et al. |
| 2021/0399911 A1 | 12/2021 | Jorasch et al. |

OTHER PUBLICATIONS

Sunyaev et al. "Cloud services certification", Communications of the ACM, vol. 56, No. 2, pp. 33-36, (Year: 2013).

* cited by examiner

SYSTEM AND METHOD FOR DYNAMICALLY ORCHESTRATING APPLICATION PROGRAM INTERFACE TRUST

CROSS-REFERENCE TO RELATED APPLICATION

This application is a Divisional of U.S. patent application Ser. No. 16/780,804 entitled "SYSTEM AND METHOD FOR DYNAMICALLY ORCHESTRATING APPLICATION PROGRAM INTERFACE TRUST" filed on Feb. 3, 2020, the disclosure of which is hereby expressly incorporated by reference in its entirety.

FIELD OF THE DISCLOSURE

The present disclosure generally relates to information handling systems, and more particularly relates to dynamically orchestrating application program interface trust.

BACKGROUND

As the value and use of information continue to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. Also, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A system includes a purchase portal configured to receive a purchase order from a customer, wherein the purchase order includes a service from each of a plurality of service providers. When receipt of the purchase order is detected, a processor determines first and second ones of the service providers associated with the purchase order; and establishes a trust relationship between the first service provider and the second service provider in a context of the customer. The processor also sends a first request for a first trust artifact to the first service provider and a second request for a second trust artifact to the second service provider; receives the first trust artifact from the first service provider, receives the second trust artifact from the second service provider, sends the first trust artifact to the second service provider, and sends the second trust artifact to the first service provider.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
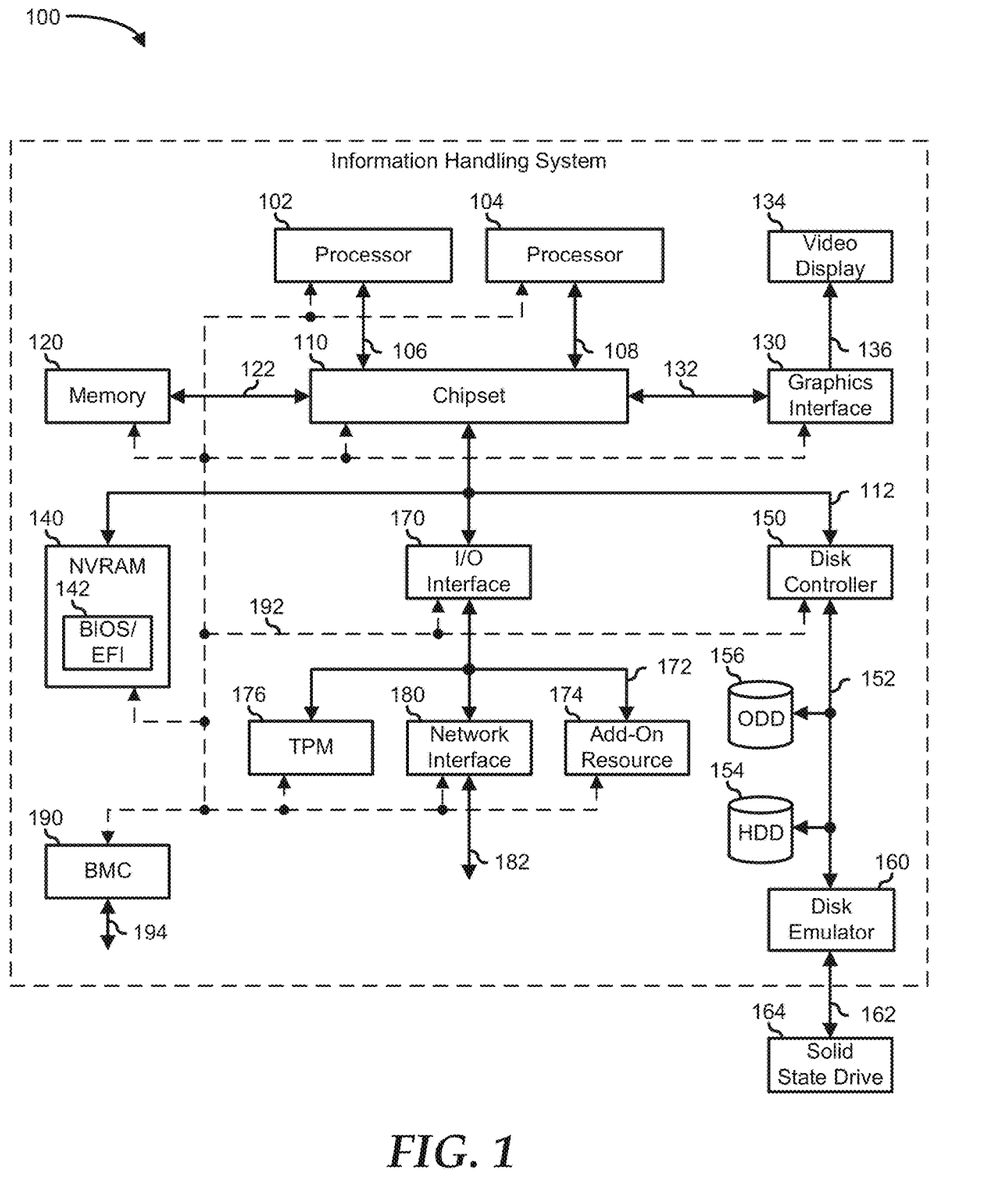
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple CPUs and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

"Cloud computing" is a model for delivering hosted services over the internet. The hosted services fall into different categories, for example: Infrastructure-as-a-Service (IaaS), Platform-as-a-Service (PaaS) and Software-as-a-Service (SaaS). These hosted services may be available for purchase at a marketplace where individuals and enterprises pose as buyers or customers and independent service vendors or service providers as sellers. The hosted services may be bundled and sold as a better-together solution. The customers may also pick and choose a set of hosted services and put together their own solution based on what hosted services are available in the marketplace. When bought as part of the solution, the service providers may integrate with each other using APIs that are protected using tokens and/or shared secrets. Typically, an administrator acting on behalf of the customer is responsible for setting up or establishing trust between these service providers. The trust may be established through a manual creation and/or copy-paste of identifiers and secrets, and/or uploading and downloading of certificates, into at least one of the service providers or at a central administration dashboard. Such process is time consuming, prone to errors, and potentially exposes sensitive information through the administrator's browser, keyboard or email system. Thus, there is a need for a facilitator such as a central trust orchestrator to automatically set up exchanges of trust artifacts such as public key certificates, between the various bundled service providers for each one of the customers.

Figure 2:
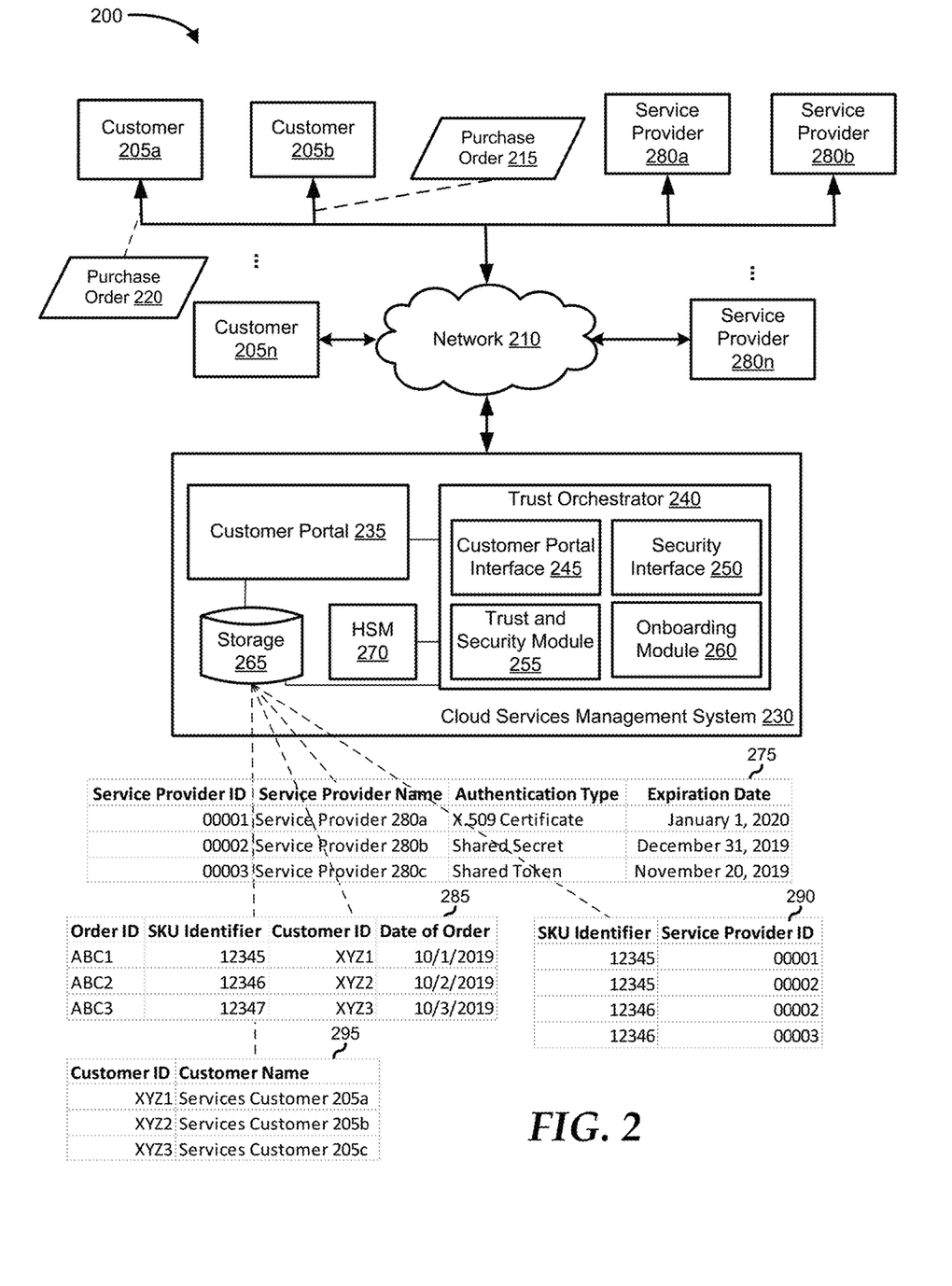
FIG. 2 is a block diagram illustrating an example of a system for dynamically orchestrating application program interface trust, according to an embodiment of the present disclosure.

FIG. 2 illustrates a system 200 for orchestrating API trusts between service providers. System 200 includes customers 205a-205n, a network 210, a cloud services management system 230, and service providers 280a-280n, wherein each one may be similar to information handling system 100. Cloud services management system 230 includes a customer portal 235, a trust orchestrator 240, a storage 265, and a hardware security module (HSM) 270. Trust orchestrator 240 includes a customer portal interface 245, a security interface 250, a trust and security module 255, and an onboarding module 260.

Customers 205a-205n, service providers 280a-280n, and cloud services management system 230 may be communicatively coupled via a network 210. In one embodiment, network 210 may include the internet. Alternatively, network 210 may include a public or private cloud services interconnection network. Network 210 may include various network traffic handling devices, including routers, switches, data security devices, firewalls, service controllers, network interface devices, or the like. The devices may be configured to facilitate communications between customers 205a-205n, service providers 280a-280n, and cloud services management system 230.

Cloud services management system 230 may include one or more information handling systems similar to information handling system 100. Cloud services management system 230 may be an online storefront or marketplace that allows customers to purchase cloud-based services and applications such as Dell Technologies Unified Workspace™, Amazon Web Services® (AWS), Microsoft Azure®, or similar. The cloud-based services and applications may be provided by third-party independent software vendors also referred to as service providers. The services provided by these service providers may be accessed via APIs. Accordingly, a customer may purchase one or more solutions from service providers that are in partnerships with cloud services management system 230. After purchase of the solution, the customer may be operational across the service providers without any customer setup.

In such a marketplace, customer portal 235 may be configured to allow a customer such as customer 205a to purchase a service or a solution, wherein the solution may include one or more services and/or applications from a service provider or a set of service providers. Customer portal 235 may maintain a listing of solutions, service providers, and its applications and/or services that customer 205a may choose from. Customer 205a may be an enterprise or a user associated with the enterprise.

Using customer portal 235, customer 205a, for example, can submit a purchase order such as purchase order 215 to purchase a bundle or set of services offered by service providers 280a-280n. For example, a service provider offering event detection and response services could be bundled and purchased together with another service provider that offers endpoint encryption services. In particular, customer 205a may purchase a solution that includes services from Carbon Black Cloud™ and CrowdStrike® for example. By bundling the services, customer 205a can avail of a solution that would be able to restrict access to the endpoint encryption keys if a threat is detected on a computer in the customer's network without figuring out how to make the services work together. In an embodiment, customer 205a may submit a purchase order 215 to purchase a particular solution which may include services provided by service provider 280a and service provider 280b. Similarly, another customer, such as customer 205b, can submit purchase order 220 to purchase another solution which may include services provided by service provider 280b and service provider 280n. The purchase order may include one or more solutions; each solution may have a different stock keeping unit (SKU). Each SKU may include one or more service providers.

Service providers 280a-280n may include telecommunications service providers, application service providers, storage service provides, internet service providers, etc. A service provider that decides to form a partnership with cloud services management system 230 may need to establish a trust relationship with trust orchestrator 240. Also, the service provider may be directed to implement a web API defined by cloud services management system 230 or trust orchestrator 240 in particular. This process may also be referred to as an onboarding process performed typically once by the service provider. The onboarding process may be performed by onboarding module 260. Once onboarded, the service provider may be listed and available for purchase by the customer via customer portal 235.

When purchased as part of a solution, a service provider may need to work together with the other service providers included in the solution. To work together, trust orchestrator 240 may need to establish trust between service providers 280a-280n. By default, a service provider does not trust another service provider. For example, one service provider doesn't have permission to use the resources and/or services of another service provider. For the one service provider to have permission to use the resources and/or services of the other service provider, the service provides may need to trust each other.

In an embodiment, a purchase order of a solution with services from one or more service providers may trigger a programmatic establishment of trust which includes the exchange of trust artifacts between the service providers associated with the purchase order. These programmatic exchanges of trust artifacts are performed dynamically by cloud services management system 230 or trust orchestrator 240 in particular on behalf of the customer. Thus, the customer has no further involvement after the purchase.

The established trust is specifically in the context of the customer which purchased the solution. For example, if customer 205a purchased a solution with services from service provider 280a and service provider 280b, the established trust is associated with customer 205a. Service provider 280a and service provider 280b may not trust each other outside of this context. If customer 205b purchased the same solution, service provider 280a and service provider 280b may have to perform the same programmatic exchange or artifacts in the context of customer 205b. On the other hand, if customer 205a purchases additional seats of the same solution purchased earlier, the additional seats may not need to perform the programmatic exchange and would just be automatically "lit up" or available for use by the customer.

The service providers communicate through defined web APIs and specifications such as Hypertext Transfer Protocol (HTTP). Due to the open nature of the web, these services need to verify the HTTP requests made into their systems to make sure that they are authorized. A way to secure the APIs is to include a trust artifact such as a signed token like a JavaScript Object Notation (JSON) Web Token (JWT) in the HTTP request. An API caller, which is the entity that sends the request, such as trust orchestrator 240 or one of service providers 280a-280n may generate, encrypt, and/or sign the token with a secret, a public key of a digital certificate such as an X.509 certificate. The API receiver, which is the entity that receives the request such as trust orchestrator 240 or the other one of service providers 280a-280n, may verify the signature before processing the API request. Private information such as a private key does not leave the security boundary of the issuing service provider. If the trust orchestrator generates the private key such as during the onboarding process, the trust orchestrator stores the private key in a secure storage such as HSM 270.

Trust orchestrator may be configured as a central trust facilitator between service providers 280a-280n for customers 205a-205n. Such that trust orchestrator 240 automatically sets up exchanges of identifiers, tokens, and/or trust artifacts such as public-key certificates, between the service providers on behalf of the customer. Trust orchestrator 240 may be a complementary system to a purchase order portal such as customer portal 235, or on its own. Prior to facilitating these exchanges, the service providers may be needed to establish a partnership with cloud services management system 230 or trust orchestrator 240 in particular. This may also be referred to as an onboarding process and is performed once for each service provider. From that point, trust orchestrator 240 can programmatically establish trust between one of the onboarded service providers with another one of the onboarded service providers on the customer's behalf. Unless referred to as an un-onboarded service provider, service providers in the current disclosure such as service providers 280a-280n have been onboarded. Trust orchestrator 240 establishes the API trust using trust artifacts or tokens from a service provider and sends them to another service provider involved in the exchange. The API trust provides a secure channel of communication between the service providers.

A trust artifact may be an object, a data structure or the like that includes at least enough of the information needed for a service provider to access the services or content of another service provider such as a domain name system or URL of the service provider. The trust artifact may also include instructions for trust orchestrator 240 and/or the service providers on how to communicate with its issuing entity. Trust artifacts may include digital certificates such as an X.509 certificate, a public key, and a shared token, or similar.

Subsequent to the onboarding process, requests/responses or API calls between trust orchestrator 240 and service providers 280a-280n are secured. The tokens may be signed by a private key of the requestor or API caller. For example, HTTP requests made by trust orchestrator 240 to a particular service provider are signed by a service provider specific X.509 certificate private key generated by trust orchestrator 240 during the onboarding process. Trust orchestrator 240 stores the X.509 certificate private key in the secured storage such as HSM 270.

Trust orchestrator 240 may be configured to monitor the expiration of the tokens, digital certificates, private/public key pairs, or other trust artifacts. Also, trust orchestrator 240 may also be configured to request another trust artifact to replace the trust artifact in cases that the original trust artifact is no longer valid. The replacement trust artifact is used to re-establish the trust between the service providers 280a-280n and/or trust orchestrator 240. For example, trust orchestrator 240 may request another digital certificate to replace an expired digital certificate of service provider 280a. Further, trust orchestrator 240 may also be configured to monitor revocation of the digital certificates and/or to dynamically replace revoked digital certificates. Certificate revocation is the action of declaring a certificate invalid before the end of its validity period.

As illustrated, in some embodiments, trust orchestrator 240 may include a trust and security module 255. Trust and security module 255 may be configured to ensure that service providers 280a-280b are properly authenticated and/or trusted such that the customer that bought or opted for a set of service providers may be able to receive services from the service providers. As each service provider may prefer a different trust artifact, trust and security module 255 may determine the appropriate trust artifact. For example, trust and security module 255 may query storage 265 to determine what information is needed by a particular service provider for the trust exchange. For example, storage 265 may include a database that stores the information in one or more tables such as table 275, table 285, table 290, and table 295. The information may be then provided to trust orchestrator 240 and/or the service provider. The tables shown in FIG. 2 are for illustration purposes only and do not limit the current disclosure. The database may include more, less, or different tables than currently shown.

Also, trust orchestrator may also include a security interface 250. Security interface 250 may be configured to ensure that service providers 280a-280n utilize the correct authorization/authentication mechanism when communicating with each other or trust orchestrator 240. Security interface 250 may query storage 265 and/or trust orchestrator 240 to determine the preferred authorization/authentication mechanism. For example, a particular service provider may prefer to use basic or bearer authentication tokens. In another embodiment, cloud services management system 230 may provide service providers 280a-280n with instructions on how to communicate with trust orchestrator 240 and/or with each other within the security context of a particular customer. For example, cloud services management system 230 or trust orchestrator 240, in particular, may provide service providers 280a-280n with APIs for services providers 280a-280n to implement during the onboarding process.

Although illustrated as a single entity, trust orchestrator 240 can be implemented in a distributed computing environment where tasks are performed by local and remote processing devices that are linked, either by hardwired links, wireless links, or by a combination of hardwired and wireless links, through a communication network. Trust orchestrator and/or its components may be comprised of software, hardware, or any combination of software and hardware as circumstances warrant.

Storage 265 may be configured to store information that may be used to facilitate the programmatic trust exchanges and/or other information or transactions between cloud services management system 230, enterprises 205a-205n, and service providers 280a-280n. For example, storage 265 may include information regarding how the service providers want to communicate and/or exchange trust artifacts which may be used by trust orchestrator 240 when facilitating the trust relationships between the service providers. Storage 265 may include other information such as solutions ordered by each enterprise, validity date ranges of the trust artifacts if any, information associated with the onboarded service providers, solutions offered by cloud services management system 230, etc. Storage 265 can be any form of persistent storage and can be configured to store different types of data. Storage 265 can include an HDD, a single magnetic recording (SMR) drive, a rewritable optical disk drive (ODD), a solid-state drive (SSD) other types of readable and writable storage media, or a combination thereof. The information may be stored in storage 265 using a database or a flat-file system.

Figure 3:
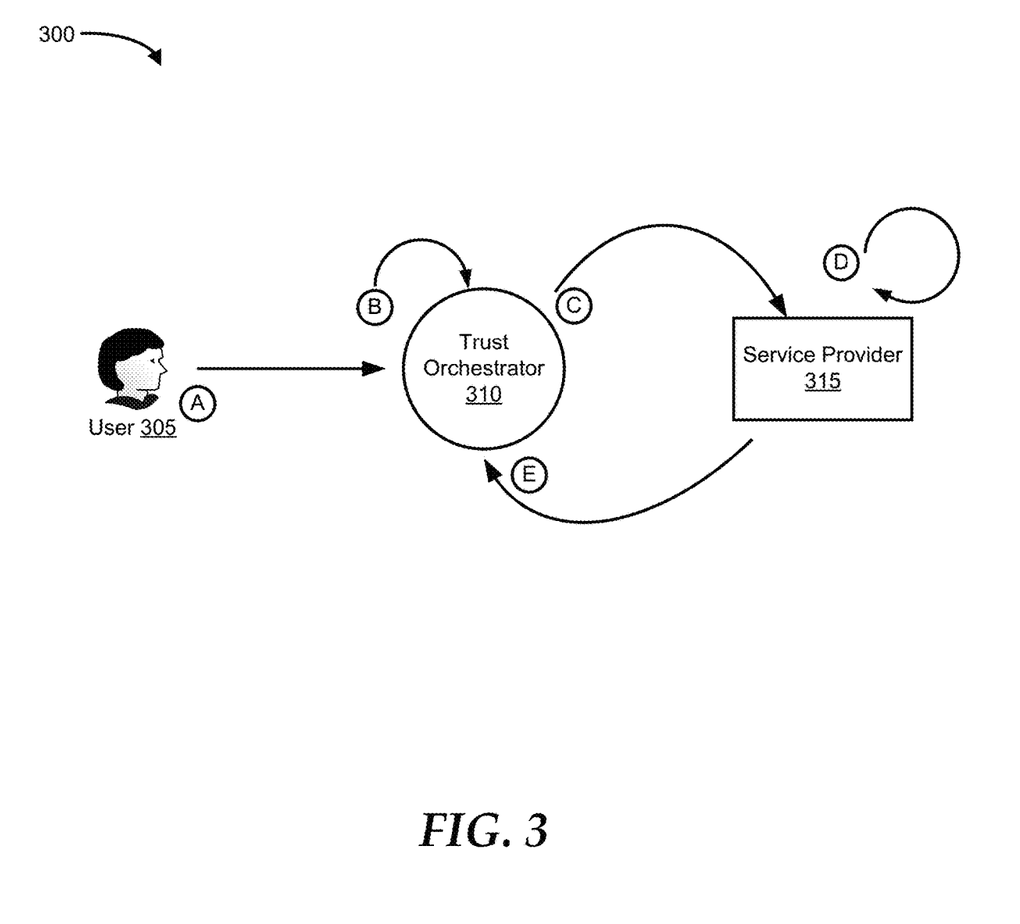
FIG. 3 is a block diagram illustrating an example of a system for onboarding a service provider, according to an embodiment of the present disclosure.

FIG. 3 illustrates a system 300 for onboarding a service provider that includes establishing a partnership and/or trust between a trust orchestrator and the service provider. System 300 is similar to system 200 and includes a user 305, a trust orchestrator 310 and a service provider 315. During the onboarding process, service provider 315 implements a set of APIs so that it is call-able from trust orchestrator 310 which are validated by the recipient using a public key of the sender. Also, a set of public X.509 certificates may be exchanged between trust orchestrator 310 and service provider 315 to establish a trust orchestrator-vendor or orchestrator-service provider trust.

User 305 may be an administrator, an operations specialist, or similar that may be authorized to initiate an onboarding process between trust orchestrator 310 and service provider 315. Similar to service providers 280a-280n, service provider 315 may be an independent software vendor. Trust orchestrator 310 may onboard service provider 315 outside the context of any customer.

FIG. 3 is annotated with a series of letters A-E. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, user 305 transmits a request to trust orchestrator 310 to onboard service provider 315. As used herein, onboarding is a process to add a particular software vendor as one of the trusted software providers by trust orchestrator 310. Various methodologies may be used to transmit the onboarding request such as via an application, a web service, an interface, etc. In particular, the request may be a representation state transfer (REST) API request, an HTTP request, a command-line interface (CLI) request, a graphical user interface (GUI), etc. The request may include information that identifies user 305, service provider 315 and/or attributes associated with user 305 and/or service provider 315. For example, the request may include a user identifier, a service provider identifier, a certificate associated with the user, a certificate associated with the service provider, a uniform resource locator that can be used to access the service provider, an internet protocol address of the service provider, etc.

At stage B, trust orchestrator 310 may generate an asymmetric key pair specific to each service provider to be onboarded. The asymmetric key pair to be used in establishing trusts with each service provider. For example, trust orchestrator 310 may generate a private/public cryptographic key pair for service provider 315 which will be used by trust orchestrator 310 to sign each communication with service provider 315. This protects against accidental cross-service provider communication. Further, this ensures that the revocation of an asymmetric key certificate of one service provider does not affect another service provider.

Trust orchestrator 310 may act as a certificate authority and generate a public key infrastructure (PKI) certificate such as an X.509 certificate specific for service provider 315. The PKI certificate is a digital certificate, which is a signed object or data structure, issued based on a pair of cryptographic keys that form a unique credential associated with a user or organization such as trust orchestrator 310. The PKI certificate may include information that identifies trust orchestrator 310 and/or service provider 315, such as a service provider identifier, a service provider name, etc. The PKI certificate may also include a serial number, an object identifier that specifies the algorithm used to sign the certificate, a validity period of the PKI certificate, a public key associated with service provider 315, a name and/or identifier of the issuer, etc. In another embodiment, trust orchestrator 310 may request a trusted certificate authority to issue the PKI certificate for service provider 315 on its behalf.

At stage C, trust orchestrator 310 transmits a request such as an HTTP request to establish trust between trust orchestrator 310 and service provider 315, also referred herein as orchestrator trust. Trust orchestrator 310 may provide its public key or a digital certificate with the request. At stage D, in response to the received request, service provider 315 generates a digital certificate also referred to as a PKI certificate such as an X.509 certificate to be used in establishing trust with trust orchestrator 310. At stage E, service provider 315 sends a response such as an HTTP response to trust orchestrator 310 that includes a public key or the digital certificate of service provider 315 to trust orchestrator 310.

Figure 4:
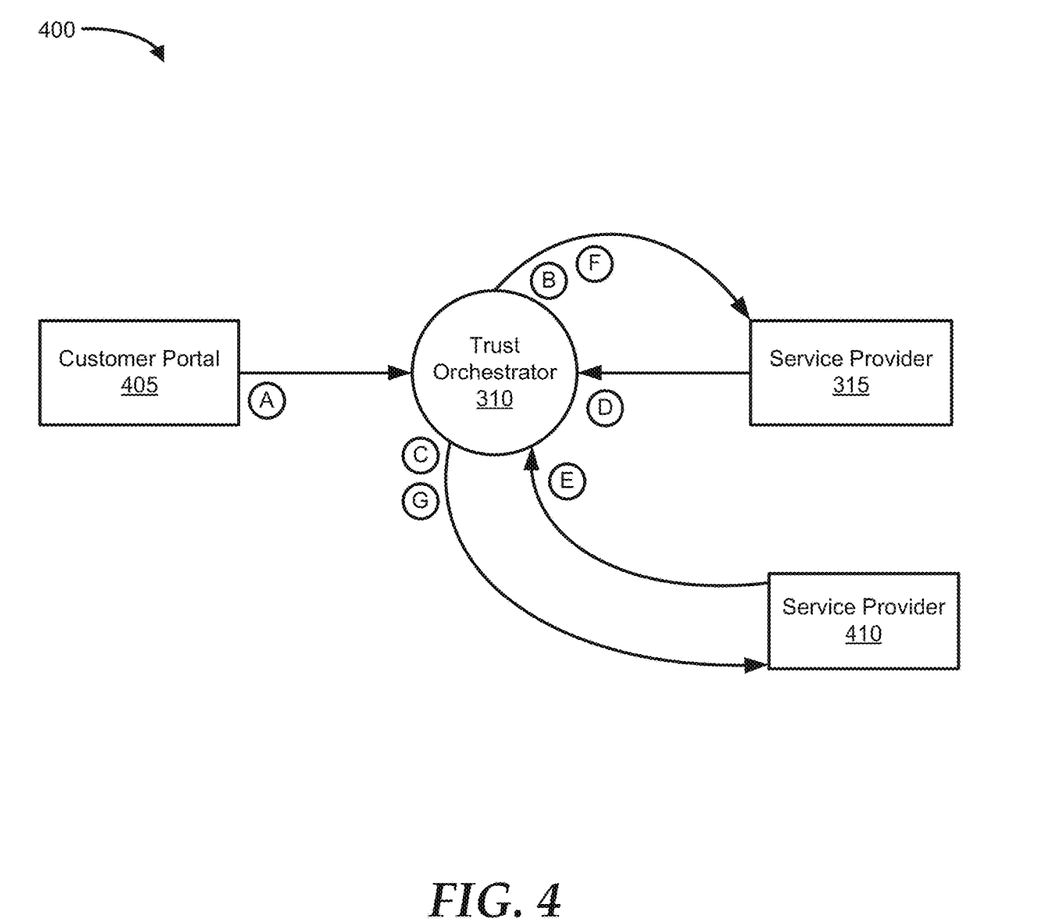
FIG. 4 is a block diagram illustrating an example of a system for dynamically orchestrating application program interface trust, according to an embodiment of the present disclosure.

FIG. 4 illustrates a system 400 for establishing trust between service providers in the context of a customer. System 400 is similar to system 200 of FIG. 2 and includes a customer portal 405, trust orchestrator 310, service provider 315, and a service provider 410. FIG. 4 is annotated with a series of letters A-G. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, trust orchestrator 310 may receive a trigger or a request to establish service-to-service trust for the customer. For example, the customer may submit a purchase order that includes a solution with services from one or more service providers. Successfully processing the purchase order may trigger a request to the trust orchestrator to establish the service-to-service trust between the service providers associated with the purchase order. Various methodologies may be used to transmit the request such as via an application, a web service, an interface, etc. In particular, the request may be a REST API request, an HTTP request, a CLI request, a GUI, etc.

For example, the solution may include an independent service vendor, like service provider 315, which provides event detection and response services. The solution may include another independent service vendor, like service provider 415, which provides endpoint encryption. The two independent service vendors may need to cooperate and trust each other so that the customer can successfully utilize their services. For example, the customer may want to restrict access to endpoint encryption keys if a threat is detected on one of the information handling systems in the customer's environment. Thus, it is important to establish trust between the aforementioned independent service vendors.

At stage B, trust orchestrator 310 may send a request to service provider 315 for a trust artifact such as an X.509 certificate on behalf of the customer and/or service provider 410. For example, trust orchestrator 310 may send a REST API request, an HTTP request or similar to service provider 315. The request may use a token such as a JSON web token to transmit the information in a JSON object for example. The information may be digitally signed using a secret such as a public cryptographic key with a message authentication code like a hash-based message authentication code (HMAC) algorithm or Rivest-Shamir-Adleman (RSA) or elliptic curve digital signature algorithm (ECDSA) cryptosystem. When the token is digitally signed using a public key, the signature certifies that the party holding the private key is the one that signed it. Additionally, the signature may be calculated using the request's header and payload, which the receiver can use to verify that the content of the request has not been tampered with. For example, the signature may be a JSON web signature that is calculated using the SHA256 algorithm with an RSA key length of 4096 bits.

At stage C, trust orchestrator 310 may send a similar request to service provider 410 for a trust artifact such as an X.509 certificate on behalf of the customer and/or service provider 315. For example, trust orchestrator 310 sends a REST API request, an HTTP request or similar to service provider 410. Similar to stage B, the trust orchestrator may sign the request.

At stage D, service provider 315 may send a response to the received request. For example service provider 315 sends a REST API response, an HTTP response or similar to trust orchestrator 310. The response may include the trust artifact as requested by trust orchestrator 310. In another embodiment, the response may include a software component, a service moniker or an object that states that the request has been accepted and will be processed asynchronously. The software component, the service moniker, or the object may include a time frame of when the trust artifact may be sent to trust orchestrator 310. Trust orchestrator 310 may send a query to service provider 315 that includes the software component, the service moniker, or the object if trust orchestrator 310 has not received the trust artifact from service provider 315 within the designated time frame.

At stage E, service provider 410 may send a response to the received request. For example, service provider 410 may send a REST API response, an HTTP response, or similar to trust orchestrator 310. Similar to stage D, the response may include the trust artifact as requested by trust orchestrator 310. In another embodiment, the response may include a software component, a service moniker, or an object that states that the request has been accepted and will be processed asynchronously. The software component, the service moniker, or the object may include a time frame of when the trust artifact may be sent to trust orchestrator 310. Trust orchestrator 310 may send a query to service provider 410 that includes the software component, the service moniker, or the object if trust orchestrator 310 has not received the trust artifact from service provider 410 within the designated time frame.

At stage F, trust orchestrator 310 may send the trust artifact of service provider 410 to service provider 315. For example, trust orchestrator 310 may send a X.509 certificate of service provider 410 with its public key to service provider 315. At stage G, trust orchestrator 310 may send the trust artifact of service provider 315 to service provider 410. For example, trust orchestrator 310 sends the X.509 certificate of service provider 315 with its public key to service provider 410. The exchange of trust artifacts allows service provider 315 to trust service provider 410 and service provider 410 to trust service provider 315. Service provider 315 and service provider 410 may then communicate with a secure channel using the public keys.

Stages A through F may be performed by trust orchestrator 310 with service provider 315 and another service provider on behalf of the customer. For example, if there is a service provider 415 that is also associate by the trigger in addition to service provider 410, the trust orchestrator will facilitate another exchange of trust artifacts in the context of the customer between service provider 315 and service provider 415.

Figure 5:
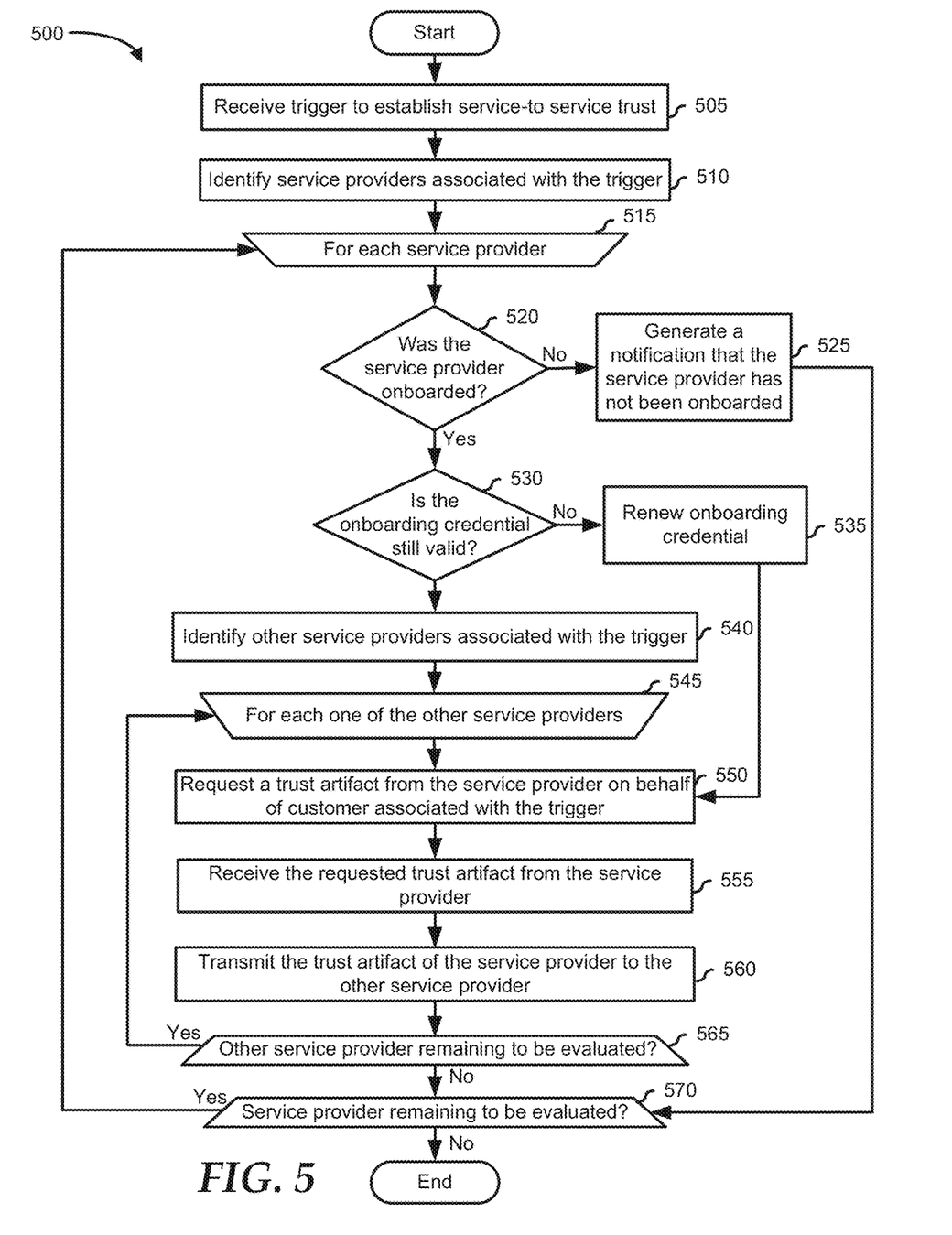
FIG. 5 is a flowchart illustrating an example of a method for dynamically orchestrating application program interface trust, according to an embodiment of the present disclosure.

FIG. 5 illustrates a method 500 for dynamically orchestrating application program interface trust between service providers by exchanging trust artifacts. The method 500 may be performed by one or more components of FIG. 2. The method 500 typically starts at block 505 where a trust orchestrator receives a trigger to establish service-to-service trust between service providers. The trigger, also referred to as a triggering event, may be a purchase of a solution by a customer, a revocation or expiration of a digital certification, a request by an administrator, etc. In one embodiment, a customer portal after a successful purchase by a customer, such as successful payment of the purchase order, may trigger a customer portal interface in the trust orchestrator to initiate the service-to-service trust on behalf of the customer by submitting a request. In another embodiment, the customer portal interface may detect the triggering event without the customer portal submitting the request. In yet another embodiment, a trust and security module that monitors expiration dates and/or revocation status of trust artifacts such as digital certificates may trigger the service-to-service trust upon determining that a trust artifact is no longer valid, such as when the trust artifact is expired and/or revoked. The method proceeds to block 510.

At block 510, the method identifies one or more service providers associated with the triggering event. The triggering event may include identifiers of the service providers. For example, the expired or revoked digital certificate may include the identifier of the service provider that generated the digital certificate. In another embodiment, the trust processor may query a database for the service providers associated with the triggering event. For example, the purchase order associated with the purchase of the solution by the customer may include a solution SKU. The trust orchestrator may determine the service providers by querying a database table such as table 290 and/or table 295 of FIG. 2. The method may generate a data structure such as a list of the identified service providers. The method proceeds to process each service provider at block 515. The method may traverse through the data structure according to an order such as the service provider identifier. The service provider being processed may be referred to as the current service provider. The method proceeds to decision block 520.

At decision block 520, a decision is made on whether the current service provider has been onboarded. If the current service provider has been onboarded, then the "YES" branch of decision block 520 is taken and the method proceeds to decision block 530. If the current service provider has not been onboarded, then the "NO" branch of decision block 520 is taken and the method proceeds to decision block 525. At block 525, the method may submit a notification such as a failure event that the current service provider has not been onboarded. After submitting the notification, the method ends.

At decision block 530, a decision is made on whether the onboarding credential of the current service provider is still valid. The onboarding credential may be a trust artifact submitted by the service provider to the trust orchestrator during the onboarding process. The trust artifact may be a digital certificate, a token, or similar. The onboarding credential may be the private/public key pair generated by the trust orchestrator during the onboarding process. If the onboarding credential of the current service provider is still valid, then the "YES" branch of decision block 530 is taken and the method proceeds to block 540. If the onboarding credential of the current service provider is not valid, then the "NO" branch of decision block 530 is taken and the method proceeds to block 535 where the onboarding credential of the current service provider is renewed. For example, the trust orchestrator sends a request for a replacement onboarding credential to the service provider. Upon receipt of a valid replacement for the onboarding credential the method proceeds to block 540. The requests and/or responses in method 500 may be based on authorized API requests/responses between the trust processor and the service providers and/or between each of the service providers. The authorized API requests/responses may be determined during the onboarding process of each of the service providers.

At block 540, the method identifies the other service providers associated with the trigger. The method may identify the other service providers based on the service providers identified in block 510. After identifying the other service providers, the method may generate a data structure such as a list of the identified other service providers. The method proceeds to process each service provider at block 545 where the method may traverse through the data structure according to an order such as the service provider identifier. The current method being processed may be referred to as the current other service provider. The method proceeds to block 550.

At block 550, the method requests a trust artifact from the current other service provider. If the trigger is associated with a customer or an enterprise the method requests the trust artifact on behalf of the customer or the enterprise associated with the trigger. For example, the trigger may be a purchase order from the customer or the enterprise. The trust artifact may be a secret, a web token, a digital certificate such as an X.509 certificate or similar. After sending the request, the method proceeds to block 545. In another embodiment, if the method just received a replacement onboarding credential from block 540 and the replacement onboarding credential is the same as the trust artifact, the method proceeds to block 555.

At block 555, the method receives the requested trust artifact from the current other service provider. The method may verify the validity and/or authenticity of the received trust artifact before proceeding to block 560. At block 560, the method sends the trust artifact of the current service provider to the current other service provider. As such this is an exchange of trust artifacts between the current service provider and the current other service provider on behalf of the customer or the enterprise. Because the exchange of trust artifacts between service providers is in the context of the customer or the enterprise, the trust artifacts exchanged between the current service provider and the current other service provider is distinct from the trust artifacts exchanged between the current service provider and a next other service provider, wherein the current other service provider is distinct from the next other service provider. After sending the trust artifact to the current other service provider, the method proceeds to block 565, where the method determines whether there is another current other service provider to be processed. If there is another current other service provider to be processed, then the "YES" branch of block 565 is taken and the method proceeds to block 545. If there no current other service provider to be processed, then the "NO" branch of block 565 is taken and the method proceeds to block 570.

At block 570, the method determines whether there is another current service provider to be processed. If there is another current service provider to be processed, then the "YES" branch of block 570 is taken and the method proceeds to block 515. If there no current service provider to be processed, then the "NO" branch of block 570 is taken and the method ends.

Although FIG. 5 show example blocks of method 500 in some implementation, method 500 may include additional blocks, fewer blocks, different blocks, or differently arranged blocks than those depicted in FIG. 5. Additionally, or alternatively, two or more of the blocks of method 500 may be performed in parallel. For example, the inner loop which includes block 545 through block 565 may be performed in parallel. In particular, a different thread may be generated for each one of the current other service provider to be processed.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
receiving, by a processor, a first request to establish trust between a first service provider and a second service provider; and
in response to receiving the first request:
sending a second request to the first service provider for a first digital certificate;
sending a third request to the second service provider for a second digital certificate;
receiving a first response from the first service provider, wherein the first response includes the first digital certificate;
receiving a second response from the second service provider, wherein the second response includes the second digital certificate;
transmitting the first digital certificate to the second service provider; and
transmitting the second digital certificate to the first service provider.

2. The method of claim 1, further comprising storing a first private key in a secured storage, wherein the first private key is generated by the processor specific to the first service provider.

3. The method of claim 1, further comprising if the first digital certificate is expired, receiving from the first service provider, a fourth request to onboard the first service provider.

4. The method of claim 3, further comprising in response to receiving the fourth request, generating a third digital certificate for the first service provider.

5. The method of claim 1, further comprising determining whether the second digital certificate is no longer valid.

6. The method of claim 5, further comprising in response to determining that the second digital certificate is no longer valid, sending a fourth request for a replacement digital certificate to the second service provider.

7. The method of claim 1, further comprising subsequent to receiving the response from the first service provider, sending, by the second service provider, a fourth request to the first service provider, wherein the fourth request is signed by the first digital certificate generated by the first service provider.

8. An information handling system, comprising:
a processor; and
a memory device storing code that when executed causes the processor to perform operations, the operations including:
receiving a first request to establish trust between a first service provider and a second service provider;
in response to the receiving the first request:
sending a second request to the first service provider for a first digital certificate;
sending a third request to the second service provider for a second digital certificate;
receiving a first response from the first service provider, wherein the first response includes the first digital certificate;
receiving a second response from the second service provider, wherein the second response includes the second digital certificate;
transmitting the first digital certificate to the second service provider; and
transmitting the second digital certificate to first service provider.

9. The information handling system of claim 8, the operations further comprising storing a first private key in a secured storage, wherein the first private key is generated by the processor specific to the first service provider.

10. The information handling system of claim 8, further comprising receiving, from another service provider, a fourth request to onboard the another service provider.

11. The information handling system of claim 10, the operations further comprising in response to receiving the fourth request, generating a third digital certificate specific to the another service provider.

12. The information handling system of claim 8, the operations further comprising determining whether the second digital certificate is no longer valid.

13. The information handling system of claim 12, the operations further comprising in response to the determining that the second digital certificate is no longer valid, sending a fourth request for a replacement digital certificate to the information handling system.

14. The information handling system of claim 8, the operations further comprising further comprising subsequent to the receiving the response from the first service provider, sending, by the second service provider, a fourth request to the first service provider, wherein the third request is signed by the first digital certificate generated by the first service provider.

15. A non-transitory computer-readable medium to store instructions that are executable to perform operations comprising:
in response to receiving a first request to establish trust between a first service provider and a second service provider:
sending a second request to the first service provider for a first digital certificate;
sending a third request to the second service provider for a second digital certificate;
receiving a first response from the first service provider, wherein the first response includes the first digital certificate;
receiving a second response from the second service provider, wherein the second response includes the second digital certificate;
transmitting the first digital certificate to the second service provider; and
transmitting the second digital certificate to the first service provider.

16. The non-transitory computer-readable medium of claim 15, the operations further comprising storing a first private key in a secured storage, wherein the first private key is generated specific to the first service provider.

17. The non-transitory computer-readable medium of claim 15, the operations further comprising if the first digital certificate is expired, then receiving, from the first service provider, a fourth request to onboard the first service provider.

18. The non-transitory computer-readable medium of claim 17, the operations further comprising in response to receiving the fourth request, generating a third digital certificate for the first service provider.

19. The non-transitory computer-readable medium of claim 15, the operations further comprising determining whether the second digital certificate is no longer valid.

20. The non-transitory computer-readable medium of claim 19, the operations further comprising in response to the determining that the second digital certificate is no longer valid, sending a fifth request for a replacement digital certificate to the second service provider.

* * * * *